US007986108B2

(12) United States Patent
Yinn et al.

(10) Patent No.: US 7,986,108 B2
(45) Date of Patent: Jul. 26, 2011

(54) LED DRIVER AND START-UP FEEDBACK CIRCUIT THEREIN

(75) Inventors: Aung Aung Yinn, Sinshih Township, Tainan County (TW); Chow-Peng Lee, Sinshih Township, Tainan County (TW)

(73) Assignee: Himax Analogic, Inc., Sinshih Township, Tainan County (TW)

( * ) Notice: Subject to any disclaimer, the term of this patent is extended or adjusted under 35 U.S.C. 154(b) by 327 days.

(21) Appl. No.: 12/437,667

(22) Filed: May 8, 2009

(65) Prior Publication Data
US 2010/0283409 A1 Nov. 11, 2010

(51) Int. Cl.
*H05B 41/36* (2006.01)
(52) U.S. Cl. ............ 315/297; 315/224; 315/209 R
(58) Field of Classification Search .......... 315/290 R, 315/297, 210, 224, DIG. 5, 291, 307, 360
See application file for complete search history.

(56) References Cited

U.S. PATENT DOCUMENTS

| | | | |
|---|---|---|---|
| 2009/0026977 A1* | 1/2009 | Omi | 315/294 |
| 2010/0156315 A1* | 6/2010 | Zhao et al. | 315/294 |
| 2010/0277072 A1* | 11/2010 | Draper et al. | 315/149 |
| 2010/0320935 A1* | 12/2010 | Wibben | 315/294 |

* cited by examiner

*Primary Examiner* — Don Le
(74) *Attorney, Agent, or Firm* — Thomas, Kayden, Horstemeyer & Risley, LLP

(57) ABSTRACT

An LED driver includes a start-up feedback circuit, an operating feedback circuit and a multiplexer. The start-up feedback circuit has first terminals for receiving LED feedback voltages each delivered from at least one LED coupled to an output terminal for outputting an output voltage, of the LED driver, and generates a start-up feedback voltage accordingly. The operating feedback circuit has second terminals for receiving the LED feedback voltages, and generates an operating feedback voltage accordingly. The multiplexer selects the start-up feedback voltage for initial boost of the output voltage when the LED driver is initially activated, and selects the operating feedback voltage for following boost of the output voltage when the output voltage increases to a certain value.

20 Claims, 3 Drawing Sheets

LED DRIVER AND START-UP FEEDBACK CIRCUIT THEREIN

BACKGROUND

1. Field of Invention

The present invention relates to a driving circuit. More particularly, the present invention relates to a light-emitting diode (LED) driver.

2. Description of Related Art

Generally, a light-emitting diode (LED) driver converts an input voltage into an output voltage required to drive one or several connected light-emitting diodes. However, the LED driver occasionally fails during the start-up process and cannot be properly activated, due to some conditions such as receiving an unstable start-up input voltage.

SUMMARY

In accordance with one embodiment of the present invention, a start-up feedback circuit in a light-emitting diode (LED) driver is provided. The start-up feedback circuit comprises at least one feedback sub-circuit which comprises a first current unit, a second current unit, a third current unit, a fourth current unit and a mirroring unit. The first current unit is biased by a ground voltage, for asserting a first current. The second current unit asserts a second current according to the first current. The third current unit is configured for receiving an LED feedback voltage to assert the first current and a first control voltage. The fourth current unit is configured for receiving the first control voltage to assert a third current mirrored from the second current and to induce a fourth current corresponding to the first control voltage. The mirroring unit is configured for asserting the fourth current and mirroring the fourth current to assert an output current corresponding to the fourth current, in which the output current is converted into a feedback voltage for boost of an output voltage of the LED driver and the LED feedback voltage corresponding to the output voltage.

In accordance with another embodiment of the present invention, a start-up feedback circuit in a light-emitting diode (LED) driver is provided. The start-up feedback circuit comprises at least one feedback sub-circuit which comprises a first p-type transistor, a first n-type transistor, a second p-type transistor, a second p-type transistor, a second n-type transistor and a mirroring unit. The first p-type transistor has a first control terminal biased by a low-level power voltage and a first terminal coupled to a high-level power voltage through a first current source. The first n-type transistor has a second control terminal coupled to the first terminal of the first p-type transistor and a second terminal coupled to the high-level power voltage through a second current source. The second p-type transistor has a third control terminal for receiving an LED feedback voltage and a third terminal coupled to the high-level power voltage through the first current source. The second n-type transistor has a fourth control terminal coupled to the third terminal of the second p-type transistor and a fourth terminal coupled to the high-level power voltage through a third current source mirrored from the second current source. The mirroring unit is consisted of a third p-type transistor and a fourth p-type transistor, in which the third p-type transistor has a fifth control terminal and a fifth terminal coupled to each other and the fourth terminal of the second n-type transistor, the fourth p-type transistor has a sixth control terminal coupled to the fifth control terminal of the third p-type transistor, and the fourth p-type transistor has a sixth terminal coupled to the low-level power voltage through a resistor unit and asserting an output current converted by the resistor unit into a feedback voltage for boost of an output voltage of the LED driver and the LED feedback voltage corresponding to the output voltage.

In accordance with yet another embodiment of the present invention, a light-emitting diode (LED) driver is provided. The LED driver comprises a start-up feedback circuit, an operating feedback circuit and a multiplexer. The start-up feedback circuit has a plurality of first terminals for receiving a plurality of LED feedback voltages each delivered from at least one LED coupled to an output terminal for outputting an output voltage, of the LED driver, and the start-up feedback circuit generates a start-up feedback voltage according to the LED feedback voltages. The operating feedback circuit has a plurality of second terminals for receiving the LED feedback voltages, and the operating feedback circuit generates an operating feedback voltage according to the LED feedback voltages. The multiplexer is coupled to the start-up feedback circuit and the operating feedback circuit, for selecting the start-up feedback voltage or the operating feedback voltage. The multiplexer selects the start-up feedback voltage for initial boost of the output voltage when the LED driver is initially activated, and selects the operating feedback voltage for following boost of the output voltage when the output voltage increases to a certain value.

In accordance with still another embodiment of the present invention, a light-emitting diode (LED) driver is provided. The LED driver comprises a start-up feedback circuit, an operating feedback circuit, a multiplexer and a compensation unit. The start-up feedback circuit has a plurality of first terminals each coupled through at least one LED to an output terminal for outputting an output voltage, of the LED driver, in which the first terminals are configured for receiving a plurality of LED feedback voltages each delivered from the LED, and the start-up feedback circuit generates a start-up feedback voltage according to the LED feedback voltages. The operating feedback circuit has a plurality of second terminals each coupled through the LED to the output terminal of the LED driver, in which the second terminals are configured for receiving the LED feedback voltages each delivered from the LED, and the operating feedback circuit generates an operating feedback voltage according to the LED feedback voltages. The multiplexer is configured for selecting the start-up feedback voltage when the LED driver is initially activated and selecting the operating feedback voltage when the output voltage increases to a certain value. The compensation unit is configured for comparing the start-up feedback voltage with a reference voltage to output a compensating signal for initial boost of the output voltage or comparing the operating feedback voltage with the reference voltage to output the compensating signal for following boost of the output voltage.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows.

DESCRIPTION OF THE EMBODIMENTS

In the following detailed description, the embodiments of the present invention have been shown and described. As will be realized, the invention is capable of modification in various respects, all without departing from the invention. Accordingly, the drawings and description are to be regarded as illustrative in nature, and not restrictive.

Figure 1:
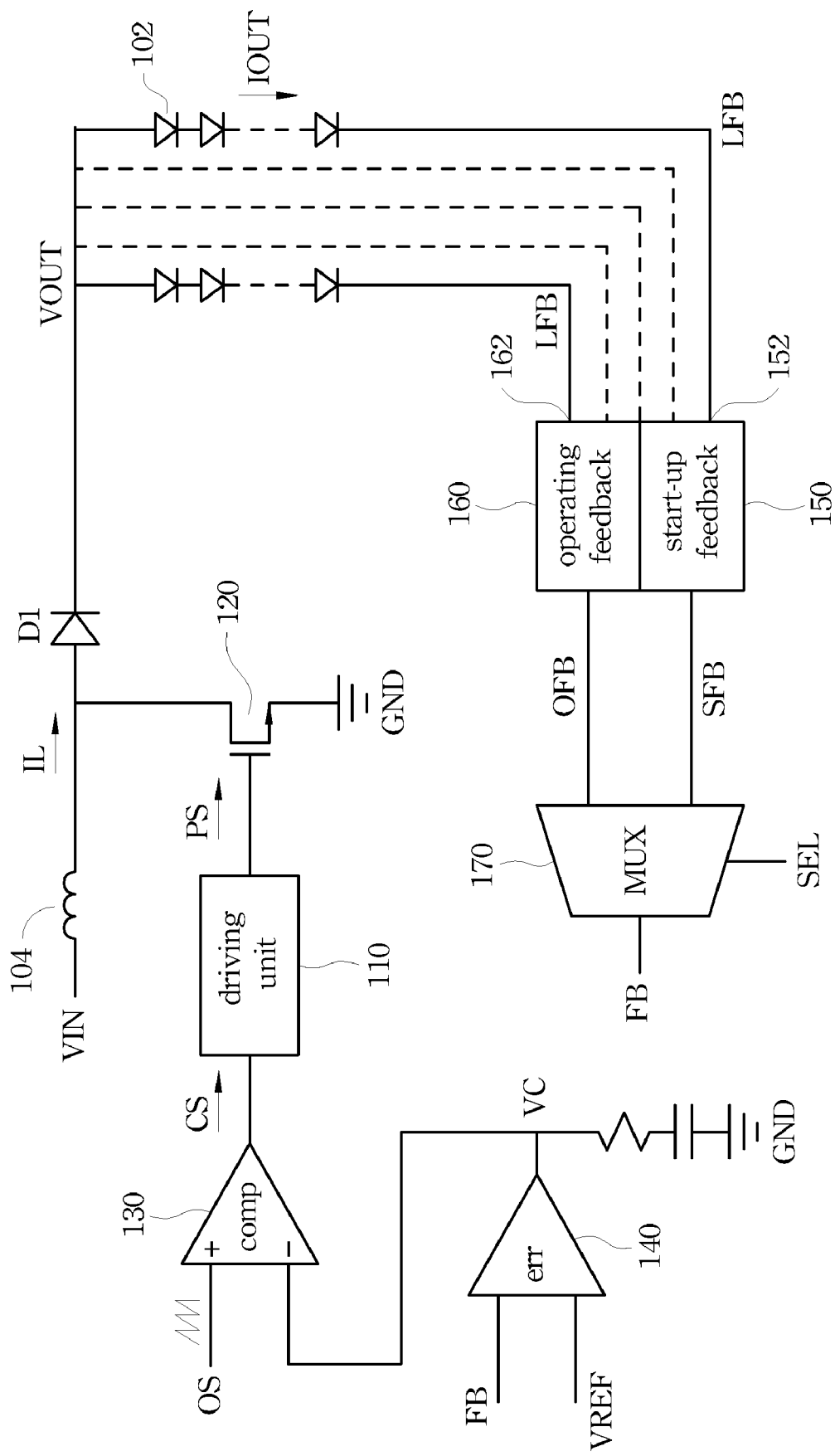
FIG. 1 illustrates a block diagram of a light-emitting diode (LED) driver according to one embodiment of the present invention.

FIG. 1 illustrates a block diagram of a light-emitting diode (LED) driver according to one embodiment of the present invention. The LED driver 100 converts an input voltage VIN into an output voltage VOUT used for driving one or several channels of LEDs 102, each of which includes one or more serially connected LEDs 102. In one embodiment, the LED driver 100 is provided for driving 8 channels of white LEDs, and each channel of white LEDs includes several serially connected white LEDs. The LED driver 100 can be designed as an integrated circuit (IC) chip.

The LED driver 100 includes a driving unit 110, a transistor switch 120, a comparator 130, a compensation unit (e.g. an error amplifier 140), a start-up feedback circuit 150, an operating feedback circuit 160 and a multiplexer 170.

The start-up feedback circuit 150 has a plurality of first terminals 152, each of which is correspondingly coupled to one channel of the LEDs 102. The operating feedback circuit 160 has a plurality of second terminals 162, each of which is correspondingly coupled to one channel of the LEDs 102 as well. In other words, each channel of the LEDs 102 is coupled to one of the first terminals 152 and one of the second terminals 162 and coupled to an output terminal for outputting the output voltage VOUT.

The first terminals 152 of the start-up feedback circuit 150 are respectively configured for receiving a plurality of LED feedback voltages LFB delivered from the LEDs 102, such that the start-up feedback circuit 150 generates a start-up feedback voltage SFB accordingly. Hereinafter, the LED feedback voltage LFB means the cathode voltage of the LED 102 first connected to the start-up feedback circuit 150 and the operating feedback circuit 160 or the voltage corresponding to the cathode voltage of the same, as shown in FIG. 1. Similarly, the second terminals 162 of the operating feedback circuit 160 are respectively configured for receiving the LED feedback voltages LFB delivered from the LEDs 102, such that the operating feedback circuit 160 generates an operating feedback voltage OFB accordingly. In one embodiment, the operating feedback circuit 160 generates the operating feedback voltage OFB based on a minimum LED feedback voltage of the received LED feedback voltages.

The multiplexer 170 is coupled to the start-up feedback circuit 150 and the operating feedback circuit 160, for selecting the voltage SFB or the voltage OFB to be a compensating feedback voltage FB. The error amplifier 140 is configured for comparing the voltage FB with a reference voltage VREF to output a compensating signal VC (usually a voltage signal). The comparator 130 compares the compensating signal VC with an oscillating signal OS and generates a comparison signal CS. The driving unit 110 receives the comparison signal CS and thus output a pulse drive signal PS to activate the transistor switch 120.

The duty ratio of the transistor switch 120 determines the proportional relationship between the output voltage VOUT and the input voltage VIN. When the pulse drive signal PS activates the transistor switch 120, the input voltage VIN charges an inductor 104. When the transistor switch 120 is not activated by the pulse drive signal PS, the inductor 104 delivers an inducting current IL, thus generating the output voltage VOUT and a diode current IOUT flowing through the LEDs 102 in each channel. The brightness of the LEDs 102 varies according to the diode current IOUT flowing therethrough.

In operation, when the LED driver 100 is initially activated, the multiplexer 170 selects the voltage SFB to be the compensating feedback voltage FB for initial boost of the output voltage VOUT, and when the output voltage VOUT increases to a certain value, the multiplexer 170 selects the voltage OFB to be the compensating feedback voltage FB for following boost of the output voltage VOUT.

Specifically, when the LED driver 100 is initially activated, the compensating feedback voltage FB is 0 V and the reference voltage VREF gradually increases from 0 V, such that the compensating signal VC is generated, and the output voltage VOUT thus gradually increases from 0 V. When the output voltage VOUT increases to a certain value, the LED feedback voltage LFB is accordingly generated and gradually increases. At that moment, the start-up feedback circuit 150 correspondingly generates the start-up feedback voltage SFB which is selected by the multiplexer 170 to be the compensating feedback voltage FB.

When the voltage SFB and the reference voltage VREF increases to some value, a so-called soft-start process is completed and a soft-start end signal SEL is transmitted to the multiplexer 170, such that the multiplexer 170 is switched to select the voltage OFB generated by the operating feedback circuit 160 to be the compensating feedback voltage FB, and the following boost of the output voltage VOUT is continued.

Figure 2:
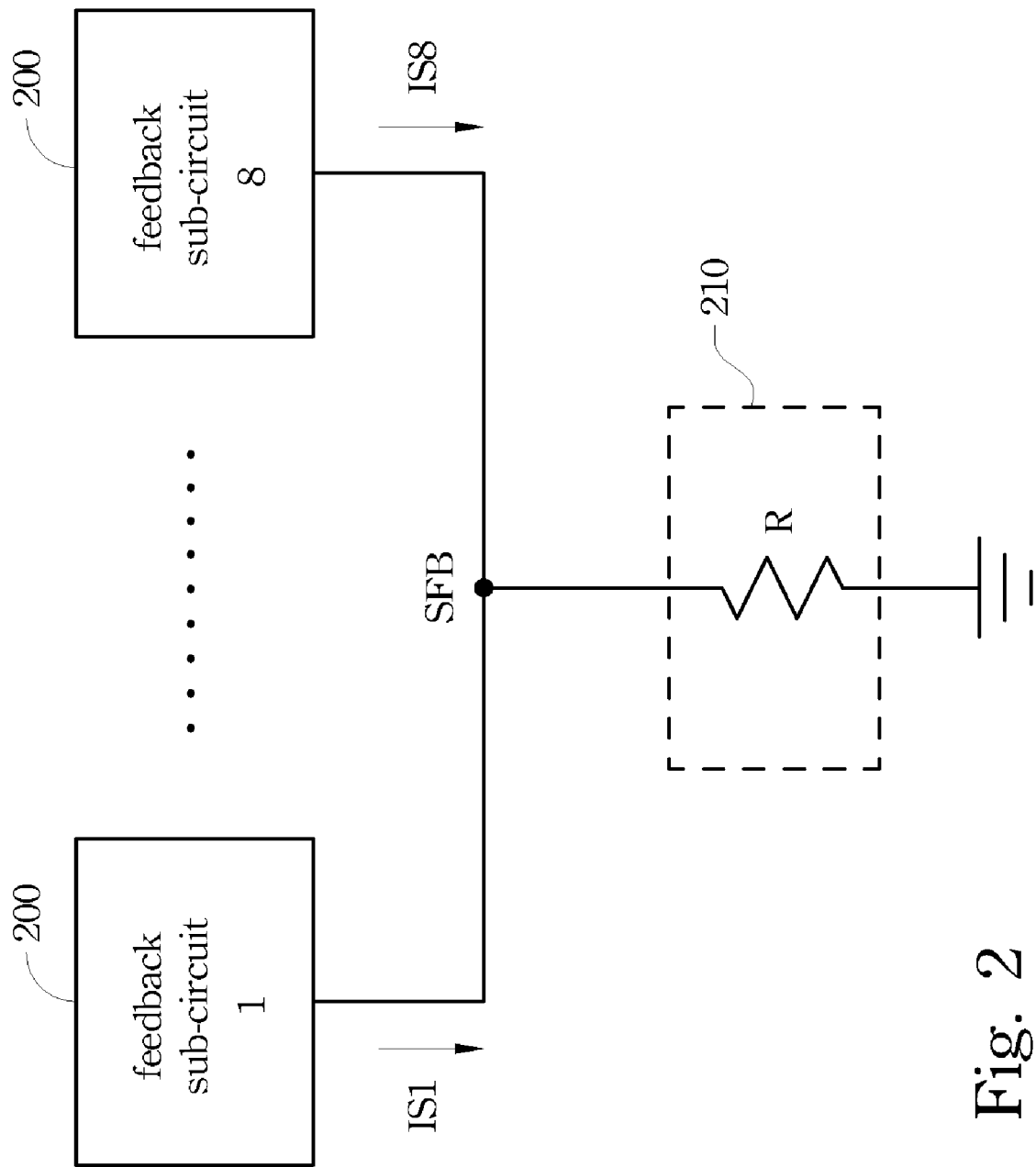
FIG. 2 illustrates a block diagram of the start-up feedback circuit as shown in FIG. 1 according to one embodiment of the present invention.

FIG. 2 illustrates a block diagram of the start-up feedback circuit as shown in FIG. 1 according to one embodiment of the present invention. The start-up feedback circuit can further include a plurality of feedback sub-circuits 200 connected in parallel with each other and a resistor unit 210 (e.g. a resistor R) connected to the feedback sub-circuits 200, in which each of the feedback sub-circuits 200 receives a corresponding LED feedback voltage LFB and accordingly outputs an output current. In present embodiment, the start-up feedback circuit includes 8 feedback sub-circuits 200, in which the $1^{st}$ feedback sub-circuits 200 outputs the output current IS1, the $2^{nd}$ feedback sub-circuits 200 outputs the output current IS2, and so on. Then, the resistor unit 210 converts the overall current consisted of the output currents IS1, IS2, . . . and IS8, into the start-up feedback voltage SFB.

Figure 3:
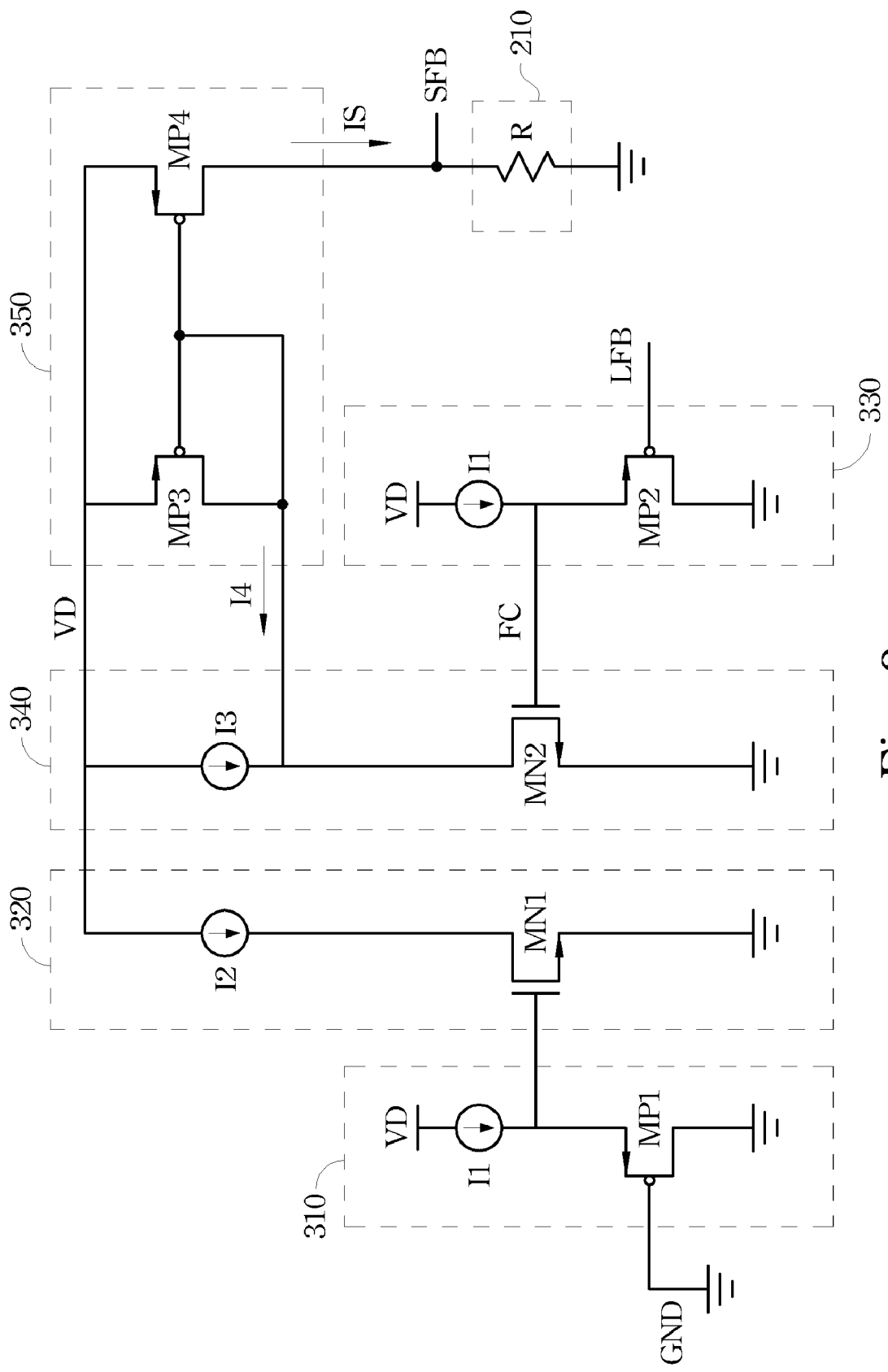
FIG. 3 illustrates a circuit diagram of the feedback sub-circuit as shown in FIG. 2 according to one embodiment of the present invention.

FIG. 3 illustrates a circuit diagram of the feedback sub-circuit as shown in FIG. 2 according to one embodiment of the present invention. The feedback sub-circuit 200 includes a first current unit 310, a second current unit 320, a third current unit 330, a fourth current unit 340 and a mirroring unit 350. The first current unit 310 is biased by a low-level power voltage (e.g. a ground voltage GND), for asserting a first current source I1. The second current unit 320 asserts a second current source I2 according to the first current source I1. The third current unit 330 receives one of the LED feedback voltages LFB to assert the first current source I1 and a first control voltage FC. The fourth current unit 340 receives the first control voltage FC to assert a third current source I3 mirrored from the second current source I2 and to induce a fourth current I4 corresponding to the first control voltage FC. The mirroring unit 350 asserts the fourth current I4 (or mirroring current) and mirrors the fourth current I4 to assert the output current IS corresponding to the fourth current I4, thus generating the start-up feedback voltage SFB. In present embodiment, when the LED feedback voltage LFB increases, the first control voltage FC increases such that the fourth current I4 and the start-up feedback voltage SFB increase accordingly.

In present embodiment, the first current unit 310 further includes a first p-type transistor (e.g. PMOS transistor MP1), in which the gate of the transistor MP1 is biased by the ground voltage GND, the source of the transistor MP1 is coupled to a high-level power voltage VD through the first current source I1, and the drain of the transistor MP1 is coupled to the ground voltage GND. The second current unit 320 further includes a first n-type transistor (e.g. NMOS transistor MN1), in which the gate of the transistor MN1 is coupled to the source of the transistor MP1, the drain of the transistor MN1 is coupled to the voltage VD through the second current source I2, and, and the source of the transistor MN1 is coupled to the ground voltage GND. The third current unit 330 further includes a second p-type transistor (e.g. PMOS transistor MP2), in which the gate of the transistor MP2 receives the LED feedback voltage LFB, the source of the transistor MP2 is coupled to the voltage VD through the first current source I1, and the drain of the transistor MP2 is coupled to the ground voltage GND. The fourth current unit 340 further includes a second n-type transistor (e.g. NMOS transistor MN2), in which the gate of the transistor MN2 is coupled to the source of the transistor MP2, the drain of the transistor MN2 is coupled to the voltage VD through the third current source I3, and, and the source of the transistor MN2 is coupled to the ground voltage GND.

The mirroring unit 350 is consisted of a third p-type transistor (e.g. PMOS transistor MP3) and a fourth p-type transistor (e.g. PMOS transistor MP4), in which the gate and drain of the transistor MP3 coupled to each other and coupled to the drain of the transistor MN2, the gate of the transistor MP4 is coupled to the gate of the transistor MP3, the drain of the transistor MP4 is coupled to the ground voltage GND through the resistor unit 210 and asserts the output current IS corresponding to the fourth current I4 asserted from the transistor MP3, and the sources of the transistors MP3 and MP4 are coupled to the voltage VD. In one embodiment, the size (i.e. W/L) of the transistor MP1 is as same as that of the transistor MP2, and the size of the transistor MN1 is as same as that of the transistor MN2.

In operation, when the LED driver is initially activated, the LED feedback voltage LFB is transiently 0 V. At that moment, the currents I4 and IS are not yet generated. Then, when the voltage LFB gradually increases, the voltage FC increases accordingly, such that the current I4 is thus generated and increases, and the current IS is generated and increases as well. As a result, the feedback voltage SFB is also generated and increases correspondingly to be selected as the compensating feedback voltage FB, as shown in FIG. 1. When the feedback voltage SFB increases to some value, the soft-start process is completed. After that, the voltage OFB replaces the voltage SFB to be selected as the compensating feedback voltage FB, as described above. Therefore, the feedback voltage SFB from the start-up feedback circuit can be used to ensure that the LED driver mis-operates or is incapable of being activated when the LED driver is initially activated, regardless of the operating feedback circuit.

For the foregoing embodiments of the present invention, the LED driver and the start-up feedback circuit therein can be employed such that the LED driver operates normally and well for sure when the LED driver is initially activated.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A start-up feedback circuit in a light-emitting diode (LED) driver, the start-up feedback circuit comprising at least one feedback sub-circuit comprising:
    a first current unit biased by a ground voltage, for asserting a first current;
    a second current unit for asserting a second current according to the first current;
    a third current unit for receiving an LED feedback voltage to assert the first current and a first control voltage;
    a fourth current unit for receiving the first control voltage to assert a third current mirrored from the second current and to induce a fourth current corresponding to the first control voltage; and
    a mirroring unit for asserting the fourth current and mirroring the fourth current to assert an output current corresponding to the fourth current, the output current being converted into a feedback voltage for boost of an output voltage of the LED driver and the LED feedback voltage corresponding to the output voltage.

2. The start-up feedback circuit as claimed in claim 1, wherein the feedback voltage and the fourth current increase when the LED feedback voltage increases.

3. The start-up feedback circuit as claimed in claim 1, wherein the first current unit comprises a first p-type transistor biased by the ground voltage, and the third current unit comprises a second p-type transistor for receiving the LED feedback voltage.

4. The start-up feedback circuit as claimed in claim 3, wherein the first p-type transistor and the second p-type transistor both are PMOS transistors.

5. A start-up feedback circuit in a light-emitting diode (LED) driver, the start-up feedback circuit comprising at least one feedback sub-circuit comprising:
    a first p-type transistor having a first control terminal biased by a low-level power voltage and a first terminal coupled to a high-level power voltage through a first current source;
    a first n-type transistor having a second control terminal coupled to the first terminal of the first p-type transistor and a second terminal coupled to the high-level power voltage through a second current source;
    a second p-type transistor having a third control terminal for receiving an LED feedback voltage and a third terminal coupled to the high-level power voltage through the first current source;
    a second n-type transistor having a fourth control terminal coupled to the third terminal of the second p-type transistor and a fourth terminal coupled to the high-level power voltage through a third current source mirrored from the second current source; and
    a mirroring unit consisted of a third p-type transistor and a fourth p-type transistor, the third p-type transistor having a fifth control terminal and a fifth terminal coupled to each other and the fourth terminal of the second n-type transistor, the fourth p-type transistor having a sixth control terminal coupled to the fifth control terminal of the third p-type transistor, the fourth p-type transistor having a sixth terminal coupled to the low-level power voltage through a resistor unit and asserting an output current converted by the resistor unit into a feedback voltage for boost of an output voltage of the LED driver and the LED feedback voltage corresponding to the output voltage.

6. The start-up feedback circuit as claimed in claim 5, wherein a mirroring current corresponding to the output current is asserted from the third p-type transistor according to the LED feedback voltage.

7. The start-up feedback circuit as claimed in claim 6, wherein the mirroring current and the feedback voltage increase when the LED feedback voltage increases.

8. The start-up feedback circuit as claimed in claim 5, wherein the first, second, third and fourth p-type transistors are PMOS transistors, and the first and second n-type transistors are NMOS transistors.

9. A light-emitting diode (LED) driver, comprising:
a start-up feedback circuit having a plurality of first terminals for receiving a plurality of LED feedback voltages each delivered from at least one LED coupled to an output terminal for outputting an output voltage, of the LED driver, the start-up feedback circuit generating a start-up feedback voltage according to the LED feedback voltages;
an operating feedback circuit having a plurality of second terminals for receiving the LED feedback voltages, the operating feedback circuit generating an operating feedback voltage according to the LED feedback voltages; and
a multiplexer coupled to the start-up feedback circuit and the operating feedback circuit, for selecting the start-up feedback voltage or the operating feedback voltage;
wherein the multiplexer selects the start-up feedback voltage for initial boost of the output voltage when the LED driver is initially activated, and the multiplexer selects the operating feedback voltage for following boost of the output voltage when the output voltage increases to a certain value.

10. The LED driver as claimed in claim 9, wherein the start-up feedback circuit further comprises a plurality of feedback sub-circuits, and each of the feedback sub-circuit comprises:
a first current unit biased by a ground voltage, for asserting a first current;
a second current unit for asserting a second current according to the first current;
a third current unit for receiving one of the LED feedback voltages to assert the first current and a first control voltage;
a fourth current unit for receiving the first control voltage to assert a third current mirrored from the second current and to induce a fourth current corresponding to the first control voltage; and
a mirroring unit for asserting the fourth current and mirroring the fourth current to assert an output current corresponding to the fourth current.

11. The LED driver as claimed in claim 10, wherein the start-up feedback circuit further comprises a resistor unit for converting an overall current consisted of the output currents from the feedback sub-circuits into the start-up feedback voltage.

12. The LED driver as claimed in claim 10, wherein the start-up feedback voltage and the fourth current increase when the LED feedback voltage received by the third current unit increases.

13. The LED driver as claimed in claim 9, wherein the start-up feedback circuit further comprises a plurality of feedback sub-circuits, and each of the feedback sub-circuit comprises:

a first p-type transistor having a first control terminal biased by a low-level power voltage and a first terminal coupled to a high-level power voltage through a first current source;
a first n-type transistor having a second control terminal coupled to the first terminal of the first p-type transistor and a second terminal coupled to the high-level power voltage through a second current source;
a second p-type transistor having a third control terminal for receiving one of the LED feedback voltages and a third terminal coupled to the high-level power voltage through the first current source;
a second n-type transistor having a fourth control terminal coupled to the third terminal of the second p-type transistor and a fourth terminal coupled to the high-level power voltage through a third current source mirrored from the second current source; and
a mirroring unit consisted of a third p-type transistor and a fourth p-type transistor, the third p-type transistor having a fifth control terminal and a fifth terminal coupled to each other and the fourth terminal of the second n-type transistor, the fourth p-type transistor having a sixth control terminal coupled to the fifth control terminal of the third p-type transistor, the fourth p-type transistor having a sixth terminal coupled to the low-level power voltage through a resistor unit and asserting an output current corresponding to the fourth current.

14. The LED driver as claimed in claim 9, wherein the operating feedback circuit generates the operating feedback voltage based on a minimum LED feedback voltage of the LED feedback voltages.

15. The LED driver as claimed in claim 9, wherein the start-up feedback circuit further comprises a plurality of feedback sub-circuits connected in parallel with each other.

16. A light-emitting diode (LED) driver, comprising:
a start-up feedback circuit having a plurality of first terminals each coupled through at least one LED to an output terminal for outputting an output voltage, of the LED driver, the first terminals configured for receiving a plurality of LED feedback voltages each delivered from the LED, the start-up feedback circuit generating a start-up feedback voltage according to the LED feedback voltages;
an operating feedback circuit having a plurality of second terminals each coupled through the LED to the output terminal of the LED driver, the second terminals configured for receiving the LED feedback voltages each delivered from the LED, the operating feedback circuit generating an operating feedback voltage according to the LED feedback voltages;
a multiplexer for selecting the start-up feedback voltage when the LED driver is initially activated and selecting the operating feedback voltage when the output voltage increases to a certain value;
a compensation unit for comparing the start-up feedback voltage with a reference voltage to output a compensating signal for initial boost of the output voltage or comparing the operating feedback voltage with the reference voltage to output the compensating signal for following boost of the output voltage.

17. The LED driver as claimed in claim 16, wherein the start-up feedback circuit further comprises a plurality of feedback sub-circuits, each of the feedback sub-circuit comprises:
a first current unit biased by a ground voltage, for asserting a first current;
a second current unit for asserting a second current according to the first current;

a third current unit for receiving one of the LED feedback voltages to assert the first current and a first control voltage;

a fourth current unit for receiving the first control voltage to assert a third current mirrored from the second current and to induce a fourth current corresponding to the first control voltage; and a mirroring unit for asserting the fourth current and mirroring the fourth current to assert an output current corresponding to the fourth current.

18. The LED driver as claimed in claim 17, wherein the start-up feedback circuit further comprises a resistor unit for converting an overall current consisted of the output currents from the feedback sub-circuits into the start-up feedback voltage.

19. The LED driver as claimed in claim 16, wherein the start-up feedback circuit further comprises a plurality of feedback sub-circuits connected in parallel with each other.

20. The LED driver as claimed in claim 16, wherein the start-up feedback circuit further comprises a plurality of feedback sub-circuits, and each of the feedback sub-circuit comprises:

a first p-type transistor having a first control terminal biased by a low-level power voltage and a first terminal coupled to a high-level power voltage through a first current source;

a first n-type transistor having a second control terminal coupled to the first terminal of the first p-type transistor and a second terminal coupled to the high-level power voltage through a second current source;

a second p-type transistor having a third control terminal for receiving one of the LED feedback voltages and a third terminal coupled to the high-level power voltage through the first current source;

a second n-type transistor having a fourth control terminal coupled to the third terminal of the second p-type transistor and a fourth terminal coupled to the high-level power voltage through a third current source mirrored from the second current source; and a mirroring unit consisted of a third p-type transistor and a fourth p-type transistor, the third p-type transistor having a fifth control terminal and a fifth terminal coupled to each other and the fourth terminal of the second n-type transistor, the fourth p-type transistor having a sixth control terminal coupled to the fifth control terminal of the third p-type transistor, the fourth p-type transistor having a sixth terminal coupled to the low-level power voltage through a resistor unit and asserting an output current corresponding to the fourth current.

* * * * *